(12) United States Patent
Kim

(10) Patent No.: US 7,174,082 B2
(45) Date of Patent: Feb. 6, 2007

(54) METHOD FOR DESIGNING DE-EMPHASIS CIRCUIT FOR VIDEO SIGNAL PROCESSING INTEGRATED CIRCUIT AND INTEGRATED CIRCUIT MADE BY THE SAME

(75) Inventor: Chul-min Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1476 days.

(21) Appl. No.: 09/832,199

(22) Filed: Apr. 11, 2001

(65) Prior Publication Data

US 2002/0031326 A1    Mar. 14, 2002

(30) Foreign Application Priority Data

Sep. 5, 2000   (KR) ................. 2000-52372

(51) Int. Cl.
*H04N 9/79* (2006.01)
(52) U.S. Cl. ..................... 386/21; 386/1; 348/710
(58) Field of Classification Search ............ 386/1, 386/15, 17, 21, 41, 44; 348/613, 625, 630, 348/631, 642, 663, 675, 679, 692, 710, 914
See application file for complete search history.

(56) References Cited

U.S. PATENT DOCUMENTS

| | | | |
|---|---|---|---|
| 4,286,282 A * | 8/1981 | Christopher et al. ......... 386/15 |
| 4,641,206 A | 2/1987 | Iwafune | |
| 5,132,806 A * | 7/1992 | Kitamura et al. ............ 386/1 |
| 5,164,862 A | 11/1992 | Kawamata | |
| 5,323,242 A * | 6/1994 | Yamamoto et al. .......... 386/41 |
| 5,872,605 A * | 2/1999 | Nonaka et al. ............. 348/710 |

FOREIGN PATENT DOCUMENTS

| | | |
|---|---|---|
| EP | 0 472 065 | 2/1992 |
| EP | 0 595 629 | 5/1994 |

OTHER PUBLICATIONS

An article "A Single Chip Y/C Signal Processing IC for VHS VCRS" written by Kawano, et al., published in IEEE Transactions on Consumer Electronics, vol. 35, No. 4, pp. 741-747 on Nov. 1989.

* cited by examiner

*Primary Examiner*—James J. Groody
*Assistant Examiner*—Christopher Onuaku
(74) *Attorney, Agent, or Firm*—Robert E. Bushnell, Esq.

(57) ABSTRACT

In a de-emphasis circuit designing method for minimizing the number of peripheral components of a video signal processing integrated circuit (IC), a circuit device for determining the level of a reproduced video signal of the de-emphasis circuit is included in the video signal processing IC. The number of components is reduced by designing all circuit elements of the circuit device for determining the level of the reproduced video signal of the de-emphasis circuit so that they are incorporated into the video signal processing IC at the time of design of the video signal processing IC, thereby reducing cost and reducing any deviation in the playback (PB) level due to external component deviation. The video signal processing IC comprises the de-emphasis circuit and a video level setting unit, the latter comprising an amplifier connected to an output of the de-emphasis circuit, a plurality of resistance elements, and a plurality of respective switches for ON/OFF switching of the resistance elements, thereby setting the gain of the amplifier and the level of the reproduced video signal.

23 Claims, 3 Drawing Sheets

METHOD FOR DESIGNING DE-EMPHASIS CIRCUIT FOR VIDEO SIGNAL PROCESSING INTEGRATED CIRCUIT AND INTEGRATED CIRCUIT MADE BY THE SAME

CLAIM OF PRIORITY

This application makes reference to, incorporates the same herein, and claims all benefits accruing under 35 U.S.C. §119 from my application DE-EMPHASIS CIRCUIT DESIGN METHOD OF VIDEO SIGNAL PROCESSING IC AND IC USING THEREOF filed with the Korean Industrial Property Office on Sep. 5, 2000 and there duly assigned Ser. No. 52372/2000.

BACKGROUND OF THE INVENTION

1. Technical Field

The present invention relates to a video signal processing integrated circuit (IC) and an IC designing method and, more particularly, to a method for designing a de-emphasis circuit for a video signal processing IC in order to reduce operating steps and material costs by minimizing the number of components of external application circuits of a de-emphasis output terminal of the video signal processing IC, and to an IC made by the method.

2. Related Art

A typical video cassette recorder (VCR) playback circuit includes a video head 110, a rotary transformer, a pre-amplifier, and a video signal processing IC. In the playback (PB) mode, a modulated video signal is detected by the video head, is input to the pre-amplifier via the rotary transformer for amplification with a predetermined gain, and is then input to the video signal processing IC which blocks a low-frequency component color signal among the signals input thereto and allows a frequency-modulated (FM) luminance signal having a high-frequency component to pass through. The high-pass filtered FM luminance signal is demodulated, and the demodulated luminance signal is subject to high-frequency component noise reduction and is then applied to a de-emphasis unit.

The de-emphasis unit compensates the demodulated luminance signal so that it has a frequency characteristic of the luminance signal before recording. The PB video level varies according to a gain which is set during manufacture of the video signal processing IC. Since the gain is set by means of a resistor having a certain value, an error in the PB level may be generated in the actual manufacturing process depending on deviation in the value of the resistor.

As described above, the video signal processing IC is designed such that a variable resistor or fixed resistor is necessarily added to the de-emphasis output pin port of the video signal processing IC. This increases the number of components, thereby lowering the manufacturing efficiency, increasing the cost of the product, and causing a deviation in the PB level due to resistance variation of the fixed resistor on the exterior of the IC.

SUMMARY OF THE INVENTION

To solve the above problems, it is an object of the present invention to provide a de-emphasis circuit designing method for a video signal processing integrated circuit (IC) in order to minimize the number of peripheral components of the video signal processing IC by incorporating a circuit device for determining the level of a reproduced video signal of the de-emphasis circuit, and to an IC made by the latter method.

Accordingly, to achieve the above object, there is provided a method for designing a video signal processing IC incorporating a luminance signal processing block and a color signal processing block having a de-emphasis circuit. A circuit element for determining the level of a reproduced video signal of the de-emphasis circuit is incorporated into the video signal processing IC, and the circuit element is connected to a ground exclusively used for luminance signal processing.

According to another aspect of the present invention, there is provided a video signal processing IC incorporating a circuit for determining the level of a reproduced video signal of a de-emphasis circuit having a reproduced video level setting unit. The reproduced video level setting unit includes an amplification unit for amplifying a demodulated luminance signal output from the de-emphasis circuit, and a gain-controlled switching unit connected to a plurality of resistance elements for determining the gain of the amplification unit, for switching electrical connection of the plurality of resistance elements according to the reproduced video level during manufacture of the video signal processing IC, and for determining the gain of the amplification unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DESCRIPTION OF THE PREFERRED EMBODIMENT

Figure 1:
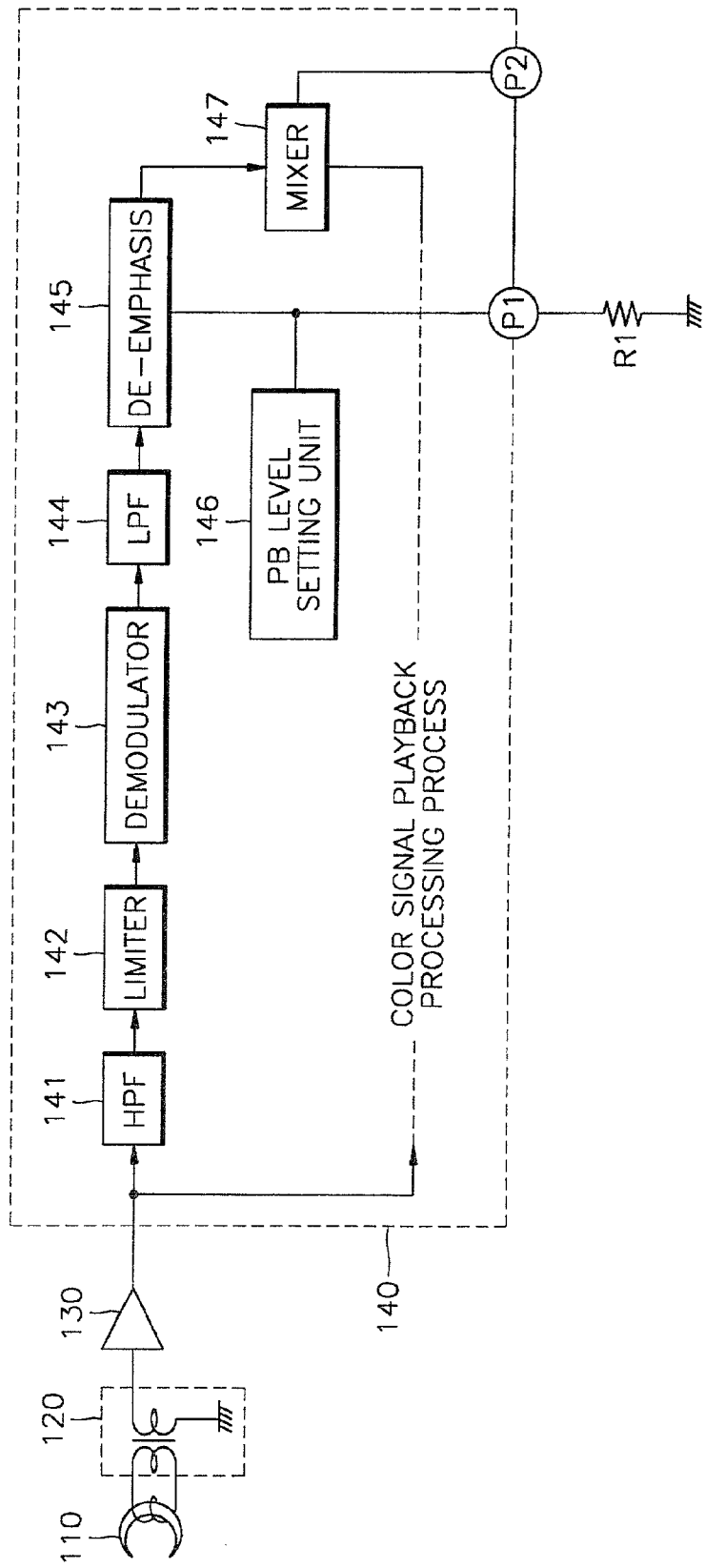
FIG. 1 is a schematic diagram illustrating a reproducing circuit of a video cassette recorder (VCR) having a video signal processing IC.

This invention will now be described in more detail with reference to the drawings, in which FIG. 1 is a schematic diagram illustrating a reproducing circuit of a video cassette recorder (VCR) having a video signal processing IC.

As shown in FIG. 1, a video cassette recorder (VCR) playback circuit includes a video head 110, a rotary transformer 120, a pre-amplifier 130, and a video signal processing integrated circuit (IC) 140 comprising a high-pass filter (HPF) 141, a limiter 142, a demodulator 143, a low-pass filter (LPF) 144, a de-emphasis unit 145, a playback (PB) level setting unit 146 and a mixer 147.

In the PB mode, a modulated video signal detected by the video head 110 is input to the pre-amplifier 130 via the rotary transformer 120 for amplification with a predetermined gain by the pre-amplifier 130, and is then input to the HPF 141 of the video signal processing IC 140.

The HPF 141 blocks a low-frequency component color signal among the signals input thereto, and allows a frequency-modulated (FM) luminance signal having a high-frequency component to pass through. The high-pass filtered FM luminance signal passes through the limiter 142, which prevents black-and-white inversion occurring during demodulation, and is then demodulated in the demodulator 143. The demodulated luminance signal is then input to the LPF 144, which reduces high-frequency component noise, and the output of LPF 144 is then applied to the de-emphasis unit 145.

The de-emphasis unit 145 is designed to have a frequency characteristic inversely symmetrical with respect to that of pre-emphasis in the recording mode. Accordingly, the de-emphasis unit 145 functions to compensate the demodulated luminance signal so that it has a frequency characteristic of the luminance signal before recording. The PB video level varies according to the gain of an amplifier is the de-emphasis unit 145. The gain of the PB level setting unit 146 is determined during manufacture of the video signal processing IC 140. That is, during manufacture of the video signal processing IC 140, the gain of the PB level setting unit 146 is set in accordance with a resistance of resistor R1 attached to pin P1. Thus, an error in the PB level may be generated in the actual manufacturing process depending on variation in the resistance of the resistor R1.

The luminance signal output from the de-emphasis unit 145 is mixed with a color signal output from a color signal playback processing procedure by the mixer 147, and is then output to pin P2.

As described above, the video signal processing IC is designed such that a variable resistor or fixed resistor for determining gain is necessarily added to the de-emphasis output pin port of the video signal processing IC. This increases the number of components, thereby lowering manufacturing efficiency, increasing the cost of the product, and causing a deviation or variation in the PB level due to a resistance variation of the fixed resistor on the exterior of the IC.

Figure 2:
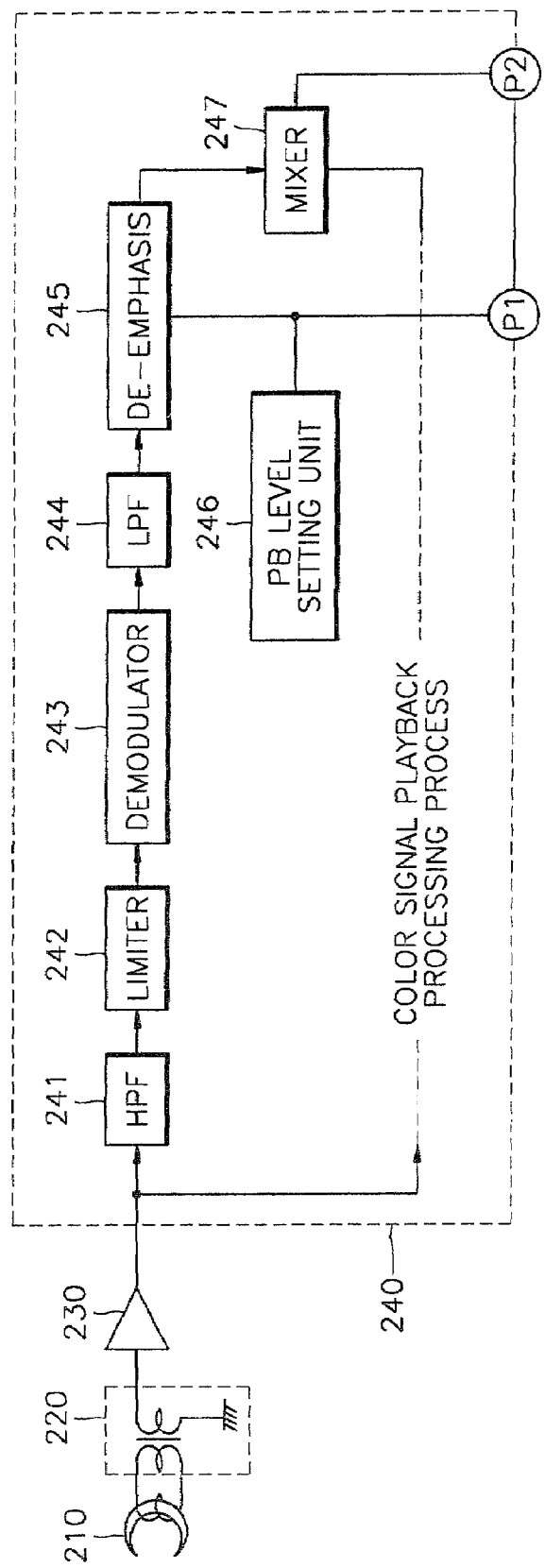
FIG. 2 is a schematic diagram illustrating a reproducing circuit of a video cassette recorder (VCR) having a video signal processing IC according to the present invention.

FIG. 2 is a schematic diagram illustrating a reproducing circuit of a video cassette recorder (VCR) having a video signal processing IC according to the present invention.

As shown in FIG. 2, a reproducing circuit for a VCR having a video signal processing IC according to the present invention includes a video head 210, a rotary transformer 220, a pre-amplifier 230, and a video signal processing IC 240 having a high-pass filter (HPF) 241, a limiter 242, a demodulator 243, a low-pass filter (LPF) 244, a de-emphasis unit 245, a playback (PB) level setting unit 246, and a mixer 247.

In general, the de-emphasis unit 245 and the PB level setting unit 246 are incorporated into a single de-emphasis circuit, and are thus processed in a single circuit block.

Figure 4:
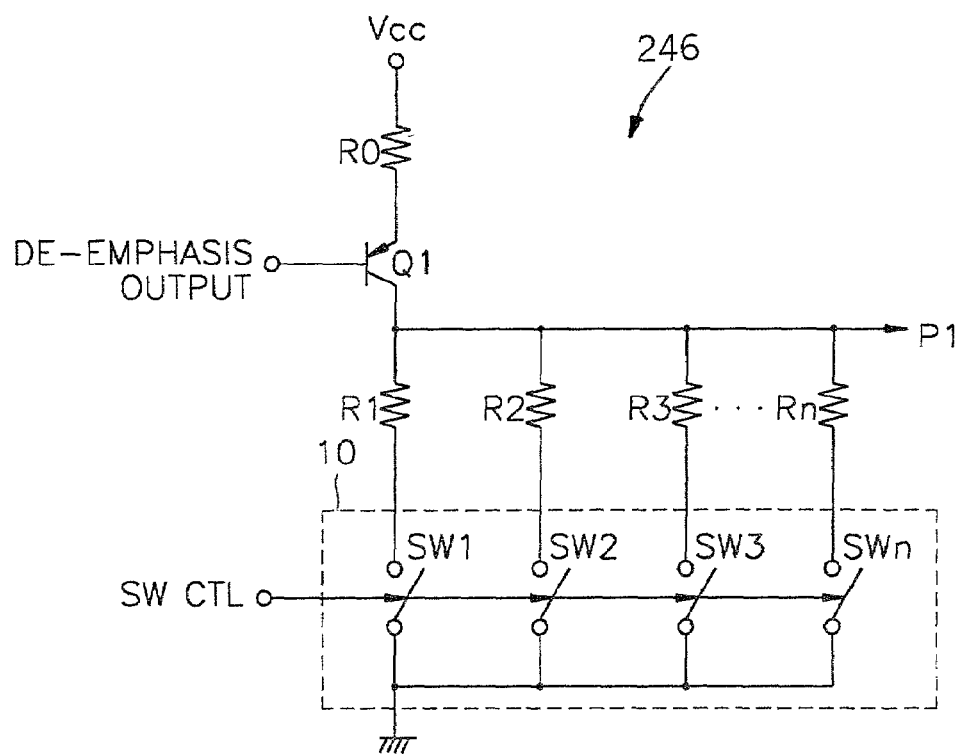
FIG. 4 is a detailed circuit diagram illustrating the PB level setting unit shown in FIG. 2.

The detailed circuitry of the PB level setting unit 246 is shown in FIG. 4, as discussed below.

First, the basic operation of the VCR will be described. During a reproduction mode, a modulated video signal detected by video head 210 is input to the pre-amplifier 230 via the rotary transformer 220, and is amplified with a predetermined gain in the pre-amplifier 230 for output to the HPF 241 of the video signal processing IC 240.

The HPF 241 blocks low-frequency color signal components contained in the modulated video signal, and produces an FM luminance signal having a high-frequency component.

The FM luminance signal output from the HPF 241 is a mixed signal comprising a low-frequency FM wave having a large amplitude and a high-frequency FM carrier wave having a low amplitude. Signal components are easily volatile at a low-amplitude area of a high-frequency portion of the FM wave, resulting in black-and-white inversion during demodulation. In order to prevent the black-and-white inversion, the high-pass filtered FM luminance signal is limited to a constant reference level by the limiter 242.

The demodulator 243 receives the output of the limiter 242, and demodulates the same to restore the FM luminance signal having a frequency deviation of 1 MHz into an unmodulated state signal. Then, the demodulated luminance signal is noise-attenuated by the LPF 244 for input to the de-emphasis unit 245.

The de-emphasis unit 245 includes an internal amplifier circuit which has a frequency characteristic inversely symmetrical with respect to pre-emphasis before modulation. The signal from LPF 244 has its gain adjusted by the de-emphasis unit 245 so as to adapt the output level of a reproduced video signal to a prescribed level, and that adjustment is performed by the PB level setting unit 246.

Figure 3:
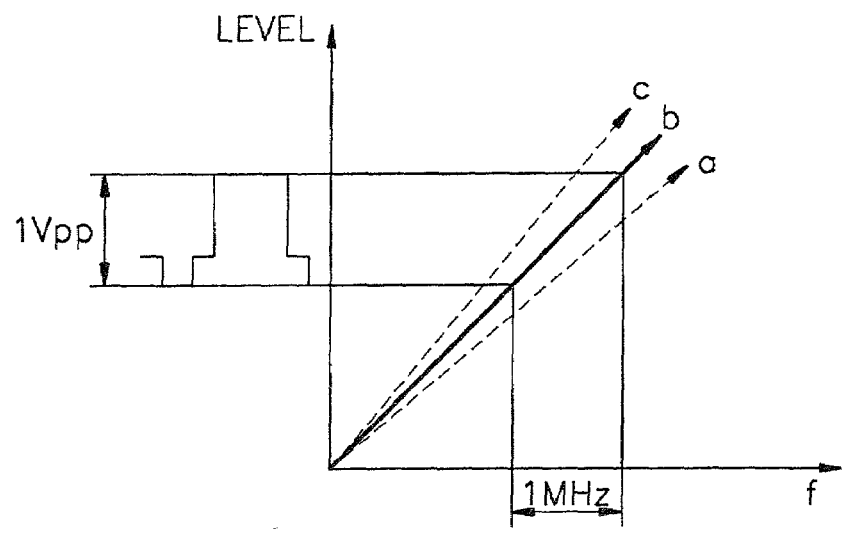
FIG. 3 is a diagram illustrating the relationship between modulation/demodulation of a frequency modulated (FM) signal and a video signal.

The reproduced video signal is defined so as to have a level of 1 Vpp by demodulating an FM video signal having a frequency deviation of 1 MHz in accordance with the Video Home System (VHS) standard, as shown in FIG. 3, which is a diagram illustrating the relationship between modulation/demodulation of a frequency modulated (FM) signal and a video signal. However, the slope of the linear relationship between the reproduced luminance signal level and a frequency deviation during demodulation may decrease or increase, as indicated by dotted arrow a or c, due to a difference or variation in the characteristics of circuit elements caused during the process of manufacturing the video signal processing IC 240. Accordingly, in the course of manufacturing the video signal processing IC 240, the PB level setting unit 256 controls so that the reproduced luminance signal level is accurately set to 1 Vpp with respect to the frequency deviation of 1 MHz in a graphical representation of the relationship between the reproduced luminance signal level and the frequency deviation during demodulation.

The operation of the PB level setting unit 246 will now be described with reference to FIG. 4, which is a detailed circuit diagram illustrating the PB level setting unit shown in FIG. 2.

The output signal of the de-emphasis unit 245 is applied to a base terminal of the transistor Q1. The circuit formed by the transistor Q1 and resistors R0, R1, . . . , Rn is an amplification unit. The gain of the amplification unit is determined by the value of the resistors R1, R2, . . . , Rn which are parallel-connected to a collector terminal of the transistor Q1.

The resistors R1, R2, . . . , Rn are grounded through switches SW1, SW2, . . . , SWn, respectively. Thus, the resistors connected to those of the switches SW1, SW2, . . . , SWn which are in the OFF state do not affect the gain value, and only the resistors connected to switches in the ON state affect the gain value of the amplification unit. In particular, the ground to which the switches SW1, SW2, . . . , SWn are connected is a ground used exclusively for luminance signal processing, and is different from the ground used for color signal reproduction processing. This feature (separation of the grounds used for luminance signal processing and color signal processing, respectively) is for the purpose of preventing noise generated in the course of processing a color signal from affecting the luminance signal.

The FM luminance signal having a frequency deviation of 1 MHz is input to the demodulator 243 of the video signal processing IC 240 of FIG. 2 during manufacture of the video signal processing IC 240 using the above-described principle. Then, the gain level of the amplification unit constituting the PB level setting unit 246 is determined such that the reproduced video signal level output from the video signal processing IC 240 becomes 1 Vpp under a termination condition of 75Ω. Then, ON/OFF switching of the switches SW1, SW2, ..., SWn of the gain-controlled switching unit 10 of FIG. 4 is carried out, depending on the determined gain, to determine the resistance value of the collector terminal of the transistor Q1.

The switches SW1, SW2, ..., SWn constituting the gain-controlled switching unit 10 are, preferably, constructed using Zener diodes, and can be designed so as to determine ON/OFF switching using Zener breakdown characteristics of the Zener diodes. In other words, if a voltage greater than a breakdown voltage is applied to a Zener diode so that it is switched on, a Zener breakdown phenomenon, in which the resistance of the Zener diode becomes substantially zero, occurs and the Zener diode is shorted (this is generally called "Zener Zapping").

As described above, according to the present invention, all circuit elements constituting a circuit which determines the level of a reproduced video signal of de-emphasis circuit 245 are incorporated into video signal processing IC 240 at the time of design of the video signal processing IC 240, thereby removing external circuit elements, including a resistor at the output terminal of the de-emphasis circuit 245 of the video signal processing IC 240.

In the embodiment of the present invention, the amplification unit in the PB level setting unit 246 is designed using a single transistor Q1 and resistors R1, R2, R3, ..., Rn. There may be a case in which the amplification unit is designed using a differential amplifier.

According to the embodiment of the present invention, the number of components can be reduced by designing all circuit elements constituting a circuit which determines the level of a reproduced video signal of de-emphasis circuit 245 so as to be incorporated into a video signal processing IC 240 at the time of design of the video signal processing IC 240, thereby reducing cost. Also, deviation in the PB level due to external component deviation can be reduced. Further, the material cost can also be reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of designing a video signal processing integrated circuit (IC), comprising the steps of:
   incorporating a luminance signal processing block and a color signal processing block having a de-emphasis circuit into the video signal processing IC;
   incorporating a circuit element for determining a level of a reproduced video signal of the de-emphasis circuit into the video signal processing IC; and
   connecting the circuit element to a ground which is used exclusively for the luminance signal processing block.

2. The method according to claim 1, wherein the circuit element comprises an amplifier and a switching element for switching resistors for determining a gain of the amplifier.

3. The method according to claim 2, wherein the switching element comprises at least one Zener diode, and ON/OFF switching of said at least one Zener diode is determined using a Zener breakdown characteristic of said at least one Zener diode.

4. The method according to claim 1, wherein the circuit element comprises an amplifier, a switching element connected to the ground, and a plurality of resistors connected between the amplifier and the switching element.

5. The method according to claim 4, wherein the switching element selectively switches each of the resistors so that certain resistors are connected to the ground and other resistors are not connected to the ground, thereby determining a gain of the amplifier.

6. The method according to claim 1, wherein a value of the circuit element is determined such that, after inputting a luminance signal and modulating the luminance signal with a frequency deviation of 1 MHz, the level of the reproduced video signal of the de-emphasis circuit is 1 Vpp under a termination condition of 75Ω.

7. A video signal processing integrated circuit (IC) incorporating a determining circuit for determining a level of a reproduced video signal of a de-emphasis circuit, said determining circuit including a reproduced video level setting unit, wherein the reproduced video level setting unit comprises:
   an amplification unit for amplifying a demodulated luminance signal output from the de-emphasis circuit;
   a plurality of resistance elements connected to the amplification unit; and
   a gain-controlled switching unit connected to the plurality of resistance elements for switching electrical connections of the plurality of resistance elements according to the level of the reproduced video signal, thereby determining a gain of the amplification unit.

8. The video signal processing IC according to claim 7, wherein the gain-controlled switching unit comprises at least one Zener diode, and ON/OFF switching of said at least one Zener diode is determined using a Zener breakdown characteristic of said at least one Zener diode.

9. The video signal processing IC according to claim 7, wherein switching control of the gain-controlled switching unit is determined such that, after inputting a luminance signal, the luminance signal is modulated with a frequency deviation of 1 MHz, and the level of the reproduced video signal is 1 Vpp under a termination condition of 75Ω.

10. The video signal processing IC according to claim 7, wherein said amplification unit comprises a transistor having a base connected to an output of the de-emphasis circuit, an emitter connected to a supply voltage, and a collector connected to said plurality of resistance elements.

11. A method of designing a video signal processing integrated circuit (IC), comprising the steps of:
   providing said video signal processing IC with a luminance signal processing block having a de-emphasis circuit;
   incorporating a determining circuit for determining a level of a reproduced video signal of the de-emphasis circuit into the video signal processing IC; and
   connecting the determining circuit between an output of the de-emphasis circuit and a ground exclusively used for the luminance signal processing block.

12. The method according to claim 11, further comprising providing the determining circuit with an amplifier and a switching element for switching resistors for determining a gain of the amplifier.

13. The method according to claim 12, further comprising forming the switching element with at least one Zener diode, and ON/OFF switching said at least one Zener diode using a Zener breakdown characteristic of said at least one Zener diode.

14. The method according to claim 11, further comprising providing the determining circuit with an amplifier, a switching element connected to ground, and a plurality of resistors connected between the amplifier and the switching element.

15. The method according to claim 14, further comprising operating the switching element by selectively switching each of the resistors so that certain resistors are connected to the ground and other resistors are not connected to the ground, thereby determining a gain of the amplifier.

16. The method according to claim 11, further comprising determining a value of the determining circuit such that, after inputting a luminance signal and modulating the luminance signal with a frequency deviation of 1 MHz, the level of the reproduced video signal of the de-emphasis circuit is 1 Vpp under a termination condition of 75Ω.

17. A video signal processing circuit for determining a level of a reproduced video signal, said circuit comprising:
   a de-emphasis circuit having an output for providing a demodulated luminance signal; and
   a video level setting unit connected between the output of the de-emphasis circuit and a ground which is used exclusively for luminance signal processing.

18. The circuit according to claim 17, wherein said video level setting unit comprises:
   an amplifier connected to the output of said de-emphasis circuit for amplifying the demodulated luminance signal; and
   a gain control switching unit for determining a gain of the amplifier.

19. The circuit according to claim 18, wherein said gain control switching unit comprises:
   a plurality of resistors; and
   a plurality of switches, one for each of said resistors, each of said switches being connected between a respective one of said resistors and the ground for switching electrical connection of selected ones of the plurality of resistors to the ground according to the level of the reproduced video signal, thereby determining the gain of the amplifier.

20. The circuit according to claim 19, wherein each of said plurality of switches comprises a Zener diode, and ON/OFF switching of each Zener diode is determined using a Zener breakdown characteristic of said each Zener diode.

21. The circuit according to claim 18, wherein said amplifier comprises a transistor having a base connected to an output of the de-emphasis circuit, an emitter connected to a supply voltage, and a collector connected to said gain control switching unit.

22. The circuit according to claim 18, wherein the gain control switching unit comprises at least one Zener diode, and ON/OFF switching of said at least one Zener diode is determined using a Zener breakdown characteristic of said at least one Zener diode.

23. The circuit according to claim 18, wherein switching control of the gain control switching unit is determined such that, after inputting a luminance signal, the luminance signal is modulated with a frequency deviation of 1 MHz, and the level of the reproduced video signal is 1Vpp under a termination condition of 75Ω.

* * * * *